(12) United States Patent
Su et al.

(10) Patent No.: US 9,571,827 B2
(45) Date of Patent: Feb. 14, 2017

(54) TECHNIQUES FOR ADAPTIVE VIDEO STREAMING (71) Applicant: Apple Inc., Cupertino, CA (US)

(72) Inventors: Yeping Su, Sunnyvale, CA (US); Hsi-Jung Wu, San Jose, CA (US); Hao Pan, Sunnyvale, CA (US); Ke Zhang, Leuven (BE)

(73) Assignee: Apple Inc., Cupertino, CA (US)

( * ) Notice: Subject to any disclaimer, the term of this patent is extended or adjusted under 35 U.S.C. 154(b) by 570 days.

(21) Appl. No.: 13/631,605

(22) Filed: Sep. 28, 2012

(65) Prior Publication Data
US 2013/0329781 A1 Dec. 12, 2013

Related U.S. Application Data (60) Provisional application No. 61/657,600, filed on Jun. 8, 2012.

(51) Int. Cl.
*H04N 19/10* (2014.01)
*H04N 21/234* (2011.01)
(Continued)

(52) U.S. Cl.
CPC ........ *H04N 19/00006* (2013.01); *H04N 19/10* (2014.11); *H04N 21/23424* (2013.01);
(Continued)

(58) Field of Classification Search
CPC  H04N 16/00006; H04N 7/50; H04N 7/26244; H04N 7/26271; H04N 7/26053; H04N 7/26941; H04N 5/455; H04N 5/445; H04N 21/234; H04N 21/2343; H04N 21/24; H04N 21/44; H04N 21/845; H04N 19/10; H04N 21/23424; H04N 21/23439; H04N 21/242; H04N 21/8456; H04N 5/14; H04N 17/004; H04N 19/61; H04N 19/127; H04N 19/156; H04N 19/184; H04N 19/187; H04N 19/00006; H04L 9/32; H04L 7/173; G06F 15/16; H04B 1/66; G06K 9/36
(Continued)

(56) References Cited

U.S. PATENT DOCUMENTS 6,275,536 B1 * 8/2001 Chen et al. .............. 375/240.25
6,393,057 B1 * 5/2002 Thoreau ................... H04N 7/24
375/240

(Continued)

FOREIGN PATENT DOCUMENTS

CN 100420250 C 9/2008
CN 101895748 A 11/2010
(Continued)

OTHER PUBLICATIONS

"Seamless Switching of Scalable Video Bitstream for Efficient Streaming", Sun et al., © 2002 IEEE DOI; 0-7803-7448/02.*
(Continued)

*Primary Examiner* — Chikaodili E Anyikire
*Assistant Examiner* — Dramos I Kalapodas
(74) *Attorney, Agent, or Firm* — Baker & Hostetler, LLP (57) ABSTRACT

A video coding server may code a common video sequence into a plurality of coded data streams, each coded data stream representing the video sequence coded using coding parameters tailored for a respective transmission bit rate. The coding may cause a set of transmission units from among the coded data streams to include coded video data from a common point of the video sequence, and a first coded frame of each transmission unit of the set to be a synchronization frame. A manifest file may be built representing an index of transmission units of the respective coded data streams. The coded data streams and manifest file
(Continued)

may be stored by the server for delivery to a client device. During download and decode, the chunks may be decoded efficiently even when switching among streams because the first frame in each chunk is a synchronization frame.

30 Claims, 9 Drawing Sheets

(51) Int. Cl.
| | | |
|---|---|---|
| *H04N 21/2343* | (2011.01) | |
| *H04N 21/242* | (2011.01) | |
| *H04N 21/845* | (2011.01) | |
| *H04N 7/12* | (2006.01) | |
| *G06K 9/36* | (2006.01) | |

(52) U.S. Cl.
CPC ..... *H04N 21/23439* (2013.01); *H04N 21/242* (2013.01); *H04N 21/8456* (2013.01)

(58) Field of Classification Search
USPC .......................................... 725/95, 96, 100
See application file for complete search history.

(56) References Cited

U.S. PATENT DOCUMENTS

| | | | |
|---|---|---|---|
| 6,959,042 B1 | 10/2005 | Liu et al. | |
| 7,949,775 B2 | 5/2011 | Virdi et al. | |
| 7,962,640 B2* | 6/2011 | Lee | 709/231 |
| 8,032,649 B2* | 10/2011 | Gupta et al. | 709/231 |
| 8,205,004 B1 | 6/2012 | Kaufman et al. | |
| 8,265,140 B2* | 9/2012 | Mehrotra | H04N 19/147 375/240.02 |
| 8,325,821 B1* | 12/2012 | Kizhepat et al. | 375/240.26 |
| 8,363,716 B2* | 1/2013 | Kalva et al. | 375/240.01 |
| 8,566,393 B2* | 10/2013 | Myers | H04N 21/234327 709/203 |
| 2002/0002708 A1* | 1/2002 | Arye | H04N 21/23424 725/95 |
| 2002/0131496 A1* | 9/2002 | Vasudevan | H04N 21/2402 375/240.11 |
| 2003/0086128 A1* | 5/2003 | Gabrani | H04N 5/14 358/479 |
| 2004/0184526 A1 | 9/2004 | Penttila et al. | |
| 2004/0196975 A1* | 10/2004 | Zhu | H04N 7/1675 380/258 |
| 2005/0123058 A1 | 6/2005 | Greenbaum et al. | |
| 2008/0127258 A1* | 5/2008 | Walker | H04N 7/163 725/39 |
| 2009/0031384 A1 | 1/2009 | Brooks et al. | |
| 2009/0282162 A1* | 11/2009 | Mehrotra et al. | 709/233 |
| 2010/0131671 A1* | 5/2010 | Kohli et al. | 709/233 |
| 2010/0135636 A1 | 6/2010 | Zhang et al. | |
| 2010/0189179 A1* | 7/2010 | Gu et al. | 375/240.16 |
| 2010/0189183 A1* | 7/2010 | Gu et al. | 375/240.28 |
| 2010/0235438 A1* | 9/2010 | Narayanan | H04L 65/60 709/203 |
| 2010/0235528 A1* | 9/2010 | Bocharov et al. | 709/231 |
| 2010/0235542 A1* | 9/2010 | Visharam et al. | 709/246 |
| 2010/0299552 A1 | 11/2010 | Schlack et al. | |
| 2010/0332671 A1* | 12/2010 | Alfonso | H04L 12/6418 709/230 |
| 2011/0080940 A1* | 4/2011 | Bocharov | H04N 21/4331 375/240.01 |
| 2011/0083037 A1* | 4/2011 | Bocharov et al. | 714/4.11 |
| 2011/0238789 A1 | 9/2011 | Luby et al. | |
| 2012/0179833 A1* | 7/2012 | Kenrick et al. | 709/231 |
| 2012/0320154 A1* | 12/2012 | Berger | H04N 13/0011 348/43 |
| 2013/0166768 A1* | 6/2013 | Gouache | H04L 65/00 709/231 |
| 2013/0307847 A1* | 11/2013 | Dey et al. | 345/419 |
| 2013/0329781 A1 | 12/2013 | Su et al. | |
| 2014/0050082 A1* | 2/2014 | Sun | H04L 47/38 370/230 |

FOREIGN PATENT DOCUMENTS

| | | |
|---|---|---|
| EP | 1298931 A2 | 4/2003 |
| EP | 2410745 A1 | 1/2012 |
| GB | 2 395 387 A | 5/2004 |
| WO | 0139502 A1 | 5/2001 |
| WO | 02/07164 A2 | 1/2002 |
| WO | 03009581 A1 | 1/2003 |
| WO | 2004/045216 A1 | 5/2004 |
| WO | 2013/004911 A1 | 1/2013 |

OTHER PUBLICATIONS

"Structured Content Independent Scalable Meta-formats (SCISM) for Media Type Agnostic Transcoding", Mukherjee et al.,—HPL-2002-166R1.*
"Seamless Switching of Scalable Video Bitstreams for Efficient Streaming", Xiaoyan Sun et al., 0-7803-7448-7/02 © 2002 IEEE.*
Schmidt, "An Architecture for Distributed, Interactive, Multi-Stream, Multi-Participant Audio and Video", Technical Report No. CSL-TR-99-781, Apr. 1999, 45 pages.
International Search Report, dated Jul. 30, 2013, from corresponding International Application No. PCT/US2013/042366 filed May 23, 2013.
Telefon AB LM Ericsson et al., "Segment Alignment and Related Issues in HTTP Streaming," Tdoc S4 AHI151, TSG-SA4#6-SWG on HTTP Streaming, Mar. 2-4, 2010, Aachen, Germany.
Oyman et al., "Quality of Experience for HTTP Adaptive Streaming Services," IEEE Communications Magazine, IEEE Service Center, Piscataway, US, vol. 50, No. 4, Apr. 1, 2012, pp. 20-27.
International Search Report and Written Opinion, mailed Aug. 20, 2014, from International Application No. PCT/US2014/018702, filed Feb. 26, 2014, 22 pages.
Mok et al., "QDASH: A QoE-aware DASH system", Proceedings of the 3rd Multimedia Systems Conference, Feb. 24, 2012, pp. 11-22.
Jiang et al., "Improving Fairness, Efficiency, and Stability in HTTP-based Adaptive Video Streaming with FESTIVE", Emerging Networking Experiments and Technologies, ACM, Dec. 10-13, 2012, Nice, France, pp. 97-108.
Taiwanese Office Action, issued Feb. 25, 2015, from corresponding TW Patent Application No. 102120403, filed Jun. 7, 2013.

* cited by examiner

TECHNIQUES FOR ADAPTIVE VIDEO STREAMING

CROSS-REFERENCE TO RELATED APPLICATION

This application claims the benefit of priority afforded by provisional application Ser. No. 61/657,600, filed Jun. 8, 2012, entitled "Techniques for Adaptive Video Streaming," the disclosure of which is incorporated herein in its entirety.

BACKGROUND

In the scenario of adaptive streaming, a common video sequence often is coded to multiple streams at different bit rates. Each stream is often partitioned to a sequence of transmission units (called "chunks") for delivery. A manifest file often is created that identifies the bit rates available for the video sequence. In a streaming service, for example, video streams and accompanied playlist files are hosted in a server. A player in a client device that gets stream information by accessing the playlist files and switches among different streams according to estimates of available bandwidth. However, current coding systems do not efficiently accommodate switches among different coding streams representing a common video content item.

Chunk partitions typically are set to include a predetermined amount of coded video data. For example, chunks may be defined to include five seconds of coded video data each. When a player switches from a first stream to a second stream, both streams representing a common video content item coded at different coding rates, the player may retrieve chunks of coded video data of the new stream and attempt to decode them. Decoding may not be possible, however, if the coded chunks of the new stream rely on other chunks as prediction references. In this circumstance, a player may have to skip decoding of portions of the new stream that rely on predecessor chunks as prediction references which may interrupt continuity of video playback. Alternatively, the player may have to request and decode the predecessor chunks in order to generate a continuous video sequence for playback. In the latter case, the predecessor chunks of the new stream likely include coded video data that is redundant to some portion of the chunks that were received and decoded from the old steam. In either case, switching among the streams causes performance impairments at the video decoder and player.

Accordingly, the inventors have identified a need in the art for video streaming techniques that provide efficient switching among different coded streams of a common video sequence.

DETAILED DESCRIPTION

Embodiments of the present invention provide video coding techniques that code a common video sequence into a plurality of coded data streams, each coded data stream representing the video sequence coded using coding parameters that are tailored for a respective transmission bit rate. The coding may cause a set of transmission units from among the coded data streams to include coded video data from a common point of the video sequence and a first coded frame of each transmission unit of the set to be a synchronization frame. A manifest file may be built representing an index of transmission units of the respective coded data streams. The coded data streams and manifest file may be stored for delivery to a client device. During download and decode, the chunks may be decoded efficiently even when switching among streams because the first frame in each chunk is a synchronization frame.

Figure 1:
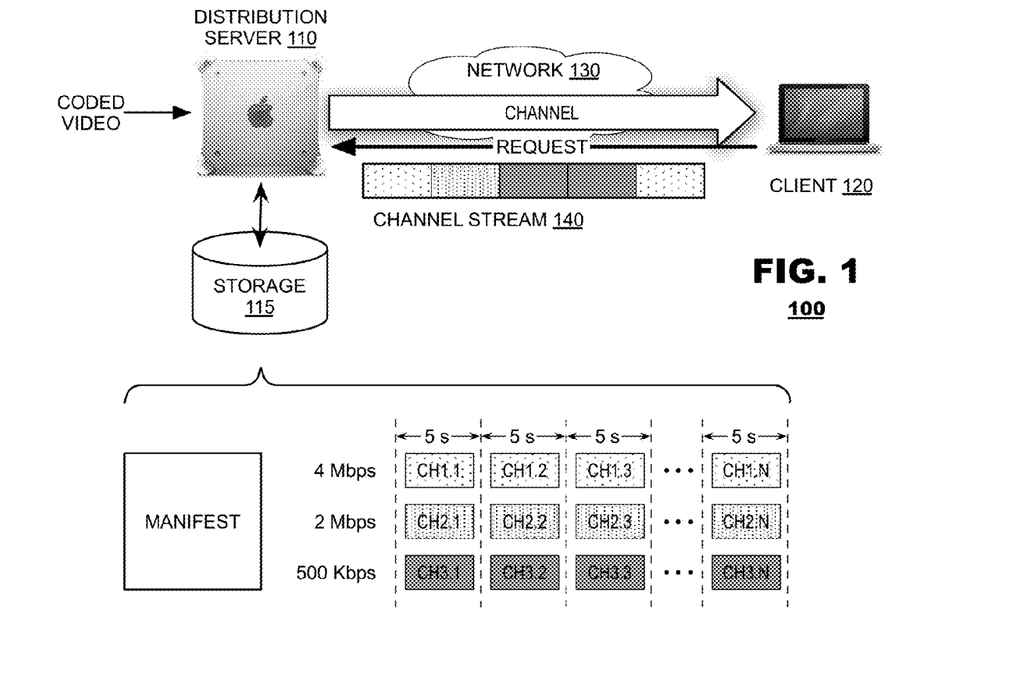
FIG. 1 is a simplified block diagram of a video distribution system suitable for use with the present invention.

FIG. 1 is a simplified block diagram of a video distribution system 100 suitable for use with the present invention. The system 100 may include a distribution server system 110 and a client device 120 connected via a communication network 130. The distribution server 110 may include a storage system 115 on which are stored a variety of video content items (e.g., movies, television shows and other motion picture content) for download by the client device 120.

The distribution server 110 may store several copies of the video content items as coded video streams, each of which are coded at a respective bit rate, frame rate and frame size. The video streams are parsed into a plurality of "chunks," segments of the coded video representing video content of a predetermined duration. The example of FIG. 1 illustrates three coded video streams that are coded at respective bitrates (4 Mb/s, 2 Mb/s and 500 Kb/s respectively) where each chunk represents 5 seconds of source video. The distribution server 110 also may store an index file, called a "manifest" file herein, that associates the coded video streams with the video content item and correlates chunks of each coded video stream with corresponding chunks of the other video streams.

When the distribution server 110 receives a request for a video content item, the distribution server 110 may provide data from the metadata file to the client device 120. Armed with information representing different data rates of the coded video streams, the client device 120 may identify one of the video streams or one of the bit rates for delivery of video. The device's identification of delivery bandwidth may be based on an estimate of bandwidth available in the network 130 and/or an estimate of processing resources available at the client device 120 to decode received data. In response, the distribution server 110 may retrieve chunks of data from storage 115 at the specified data rate, may build a channel stream from the retrieved chunks and may transmit the channel stream 140 to the client device 120.

Over time, as the distribution server 110 delivers its chunks to the client device 120, the client device 120 may request delivery of the video content item at a different data rate. For example, the client device 120 may revise its estimates of network bandwidth and/or local processing resources. In response, the distribution server 110 may retrieve chunks corresponding to a different data rate and build them into the channel stream. The client device 120 may request different data rates repeatedly during a delivery session and, therefore, the channel stream 140 that is delivered to the client device 120 may include chunks taken from a variety of the video coding streams.

Manifest files may store syntactic elements representing various types of data. For each stream, for example, a manifest file may include data indicating whether it contains chunks with different resolutions. A player may be programmed to respond to such an indication by updating video resolution information at the beginning of chunks.

In another example, for each stream, the manifest file may include data indicating whether the first frames of all the chunks are synchronization frames. A player may respond to the indication by selecting a frame or chunk to switch to when switching among streams.

In a further example, for each stream, the manifest file may include data indicating its visual quality. A player may respond to the indication by switching among streams to achieve the best visual experience, for example, by maximizing average visual quality and/or minimizing visual quality jumps.

In yet another example, for each chunk, the manifest file may include data indicating its bit rate. A player may respond to the indication by adjusting its buffering and/or switching behavior according to the chunk bit rates.

In a further example, for each chunk, the manifest file may include data indicating its resolution. A player may respond to the indication by adjusting its video resolution for playback.

In yet another example, for each chunk, the manifest file may include data indicating whether it contains frames with different resolutions. A player may respond to the indication by adjusting its video resolution for playback and/or scaling decoded video to smooth out playback.

In another example, for each chunk, the manifest file may include data indicating the bandwidth required to play the rest of the stream starting from or after the chunk. A player may respond to the indication by selecting among the streams for download and playback.

In a further example, for each chunk, the manifest file may include data indicating whether its first frame is a synchronization frame. A player may respond to the indication by selecting among the frames and/or chunks to switch when switching among streams.

In yet another example, for each chunk, the manifest file may include data indicating a stream to which the player should switch after processing the chunk. A player may respond to the indicating by switching to the stream identified in the manifest file.

Figure 2:
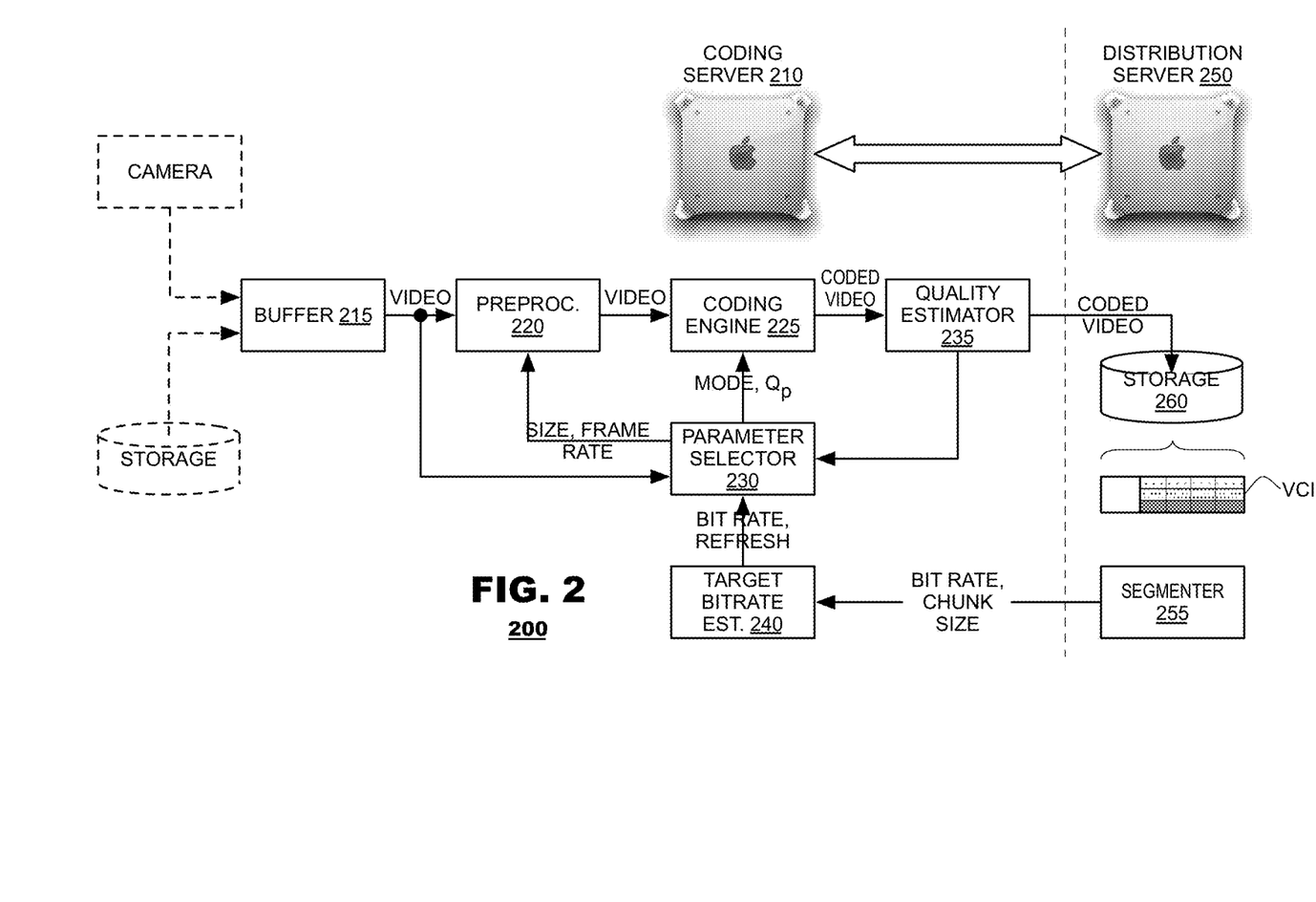
FIG. 2 is a simplified block diagram of a system having an integrated coding server and distribution server.

FIG. 2 is a simplified block diagram of a system 200 having an integrated coding server 210 and distribution server 250. The coding server 210 may include buffer storage 215, a preprocessor 220, a coding engine 225, a parameter selector 230, a quality estimator 235 and a target bit-rate estimator 240. The distribution server 250 may include a segmenter 255 and storage 260.

The buffer 215 may store input video, typically from a camera or a storage device, for processing by other components of the coding server 210. For example, the preprocessor 220 may alter a size and/or a frame rate of the video sequence. The preprocessor 220 may apply size and/or frame rate modifications to video that is read from the buffer 215. The preprocessor 220 may perform different size and/or frame rate modifications on a common video sequence as the coding server 210 generates its various coded versions of the sequence.

The coding engine 225 may apply data compression operations to the video sequence from the preprocessor 220. The coding engine 225 may operate according to any of the common video coding protocols including the MPEG, H.263, H.264 and HEVC (H.265) families of coding standards. The coding engine 225 may apply coding parameters to different elements of the video sequence, including, for example, a coding mode selection and quantizer parameter selection. The coding mode selection may select a coding mode to be applied to a frame being coded, for example, whether to code an input frame as an I-frame, P-frame or B-frame. The quantizer parameter selection may select a quantization parameter to apply to transform coefficients (or other data) to truncate these data elements prior to entropy coding and transmission.

A parameter selector 230 may generate parameter data to the preprocessor 220 and/or coding engine 225 to govern their operation. The parameter selector 230, for example, may cause the preprocessor 220 to alter the size and/or frame rate of data output to the coding engine 225. The parameter selector 230 may impose coding modes and/or quantization parameters to the coding engine 225. The parameter selector 230 may select the coding parameters based on bit rate estimates received from the target bit-rate estimator 240 and based on complexity estimates of the source video.

A quality estimator 235 may estimate quality of coded video data output by the coding engine. The quality estimator 235 may output digital data representing a quantitative estimate of the quality of the coded video data.

A target bit-rate estimator 240 may generate bit-rate estimates for segments of video based on the data rates to be supported by the distribution server 250.

During operation, the target bit-rate estimator 240 may apportion a bit rate to the video sequence and determine a refresh rate based on data rate and chunk size estimates provided by the distribution server 250. In response to the bit rate selected by the target bit-rate estimator 240 and based on analysis of the video sequence itself, the parameter selector 230 may select operational parameters for the preprocessor 220 and/or coding engine 225. For example, the parameter selector 230 may cause the preprocessor 220 to adjust the frame size (or resolution) of the video sequence. The parameter selector 230 also may select coding modes and quantization parameters to frames within the video sequence. The coding engine 225 may process the input video by motion compensation predictive techniques and output coded video data representing the input video sequence.

The quality estimator 235 may evaluate the coded video data and estimate the quality of the video sequence coded according to the selected parameters. The quality estimator 235 may determine whether the quality of the coding meets predetermined qualitative thresholds associated with the bit rate set by the distribution server 250. If the quality estimator 235 determines that the coding meets the thresholds, the quality estimator 235 may validate the coding. By contrast, if the quality estimator 235 determines that the coding does not meet sufficient quality thresholds associated with the target bit rate, the quality estimator 235 may revise the coding parameters applied by the parameter selector 230 and may cause the preprocessor 220 and coding engine 225 to repeat operation on the source video.

Once the parameter selector 230 selects a set of processing and coding parameters that satisfy quality metrics established by the quality estimator 235, the coding server 210 may advance to the next bit rate supported by the distribution server 250. Again, the parameter selector 230 and quality estimator 235 may operate recursively, selecting parameters, applying them in preprocessing operations and coding, estimating quality of the coded video data obtained thereby and revising parameters until the quality requirements are met.

Figure 3:
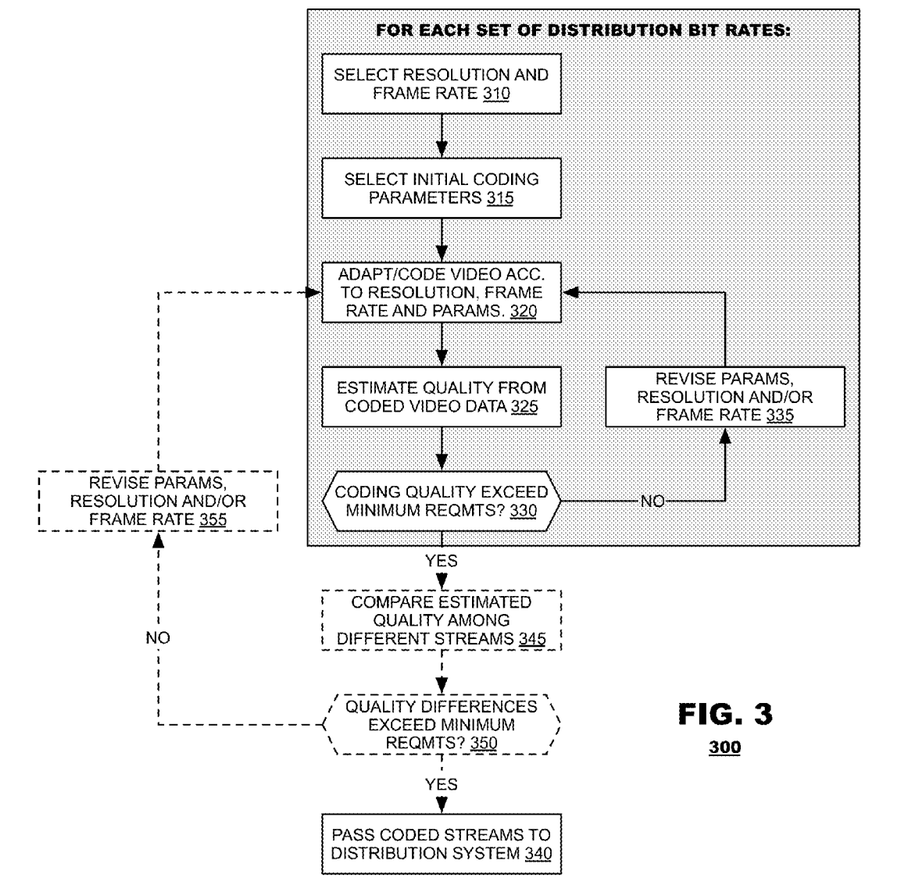
FIG. 3 illustrates a method according to an embodiment of the present invention.

FIG. 3 illustrates a method 300 according to an embodiment of the present invention. The method 300 may process a source video sequence iteratively using each set of distribution bit rates as a governing parameter. During each iteration, the method 300 may select a resolution and/or frame rate of the video sequence (box 310). The resolution and frame rate may be derived from the distribution bit rates supported by the distribution server 250 (FIG. 2). The method 300 also may select an initial set of coding parameters for processing of the video (box 315). The initial parameters also may be derived from the distribution bit rates supported by the distribution server 250 (FIG. 2). The method 300 may cause the video to conform to the selected resolution and frame rate and may have the video sequence coded according to the selected parameters (box 320). Thereafter, the method 300 may estimate the quality of video data to be recovered from the coded video sequence obtained thereby (box 325) and may determine whether the coding quality exceeds minimum requirements (box 330) for the specified distribution data rate. If not, the method 300 may revise selections of resolution, frame rate and/or coding parameters (box 335) and may cause operation to return to box 320. In an embodiment, the method 300 may pass the coded streams to the distribution system (box 340).

In another embodiment, when coded video is obtained that meets the minimum quality requirements for all streams, the method 300 may compare quality estimates among the streams obtained thereby (box 345). The method 300 may determine whether sufficient quality differences are established between the streams. If so, then the method 300 may pass the coded streams to the distribution system (box 340). If not, however, then the method 300 may revise resolution, frame rate and/or coding parameter selections of one or more of the coded video sequences that exhibit insufficient qualitative differences with other streams (box 350) and may cause the operation of boxes 320-335 to be repeated upon those streams (box 355). Operation of this embodiment of method 300 may repeat until the video sequence has been coded under all distribution bit rates and sufficient qualitative differences have been established for the sequence at each coded rate.

The method 300 accommodates several variations. In one embodiment, video resolutions, video frame rates and bit rates may be determined jointly based on estimates of the characteristics of visual quality and streaming performance. In another embodiment, target bit rates may be set based on estimates of quality variations among streams with neighboring bit-rate values. In a further embodiment, the video resolution and frame rate to be used at a specific bit rate may be selected based on a quality measure of the coded video such as the peak signal-to-noise ratio ("PSNR") or a perceptual quality metric.

In another embodiment of the present invention, chunk durations may vary according to the local and global bit-rate characteristics of coded video data. In other words, a target bit rate may be estimated for the video data, which may establish bit-rate budgets over predetermined time periods. Coded video data may fall under or exceed the bit-rate budgets. Chunk durations may be set to accommodate such variations.

Alternatively, chunk durations may vary according to the local and global visual-quality characteristics of the coded video data. Further, chunk durations may vary in response to detections of scene changes within the source video content. In another embodiment, chunk durations may vary based on video coder requirements for addition of synchronization frames of the coded streams.

In another embodiment, the rate control of a video encoder may be performed at a chunk level, i.e., chunks of a single stream and chunks of multiple streams corresponding to the same period of source video. Moreover, the stream partition and chunk-level rate control may be performed iteratively in multiple passes of the coding engine.

In an embodiment that employs a multi-pass encoder, an encoder may decide how to place chunk boundaries and which chunks will be re-encoded in future passes based on the collected information of bit rates and visual quality from previous coding passes.

In a further embodiment, rate control and stream partitioning may vary to reduce peak chunk bit rates. A dynamic programming approach may be applied to determine the optimal partition by minimizing the peak chunk bit rate.

Alternatively, rate control and stream partitioning may vary to reduce variation among chunk bit rates. A dynamic programming approach may be applied to determine the optimal partition by minimizing the variation of chunk bit rates.

In another embodiment, rate control and stream partitioning may be optimized to guarantee particular constraints of visual quality, measured by metrics such as PSNR of the coded video.

Figure 4:
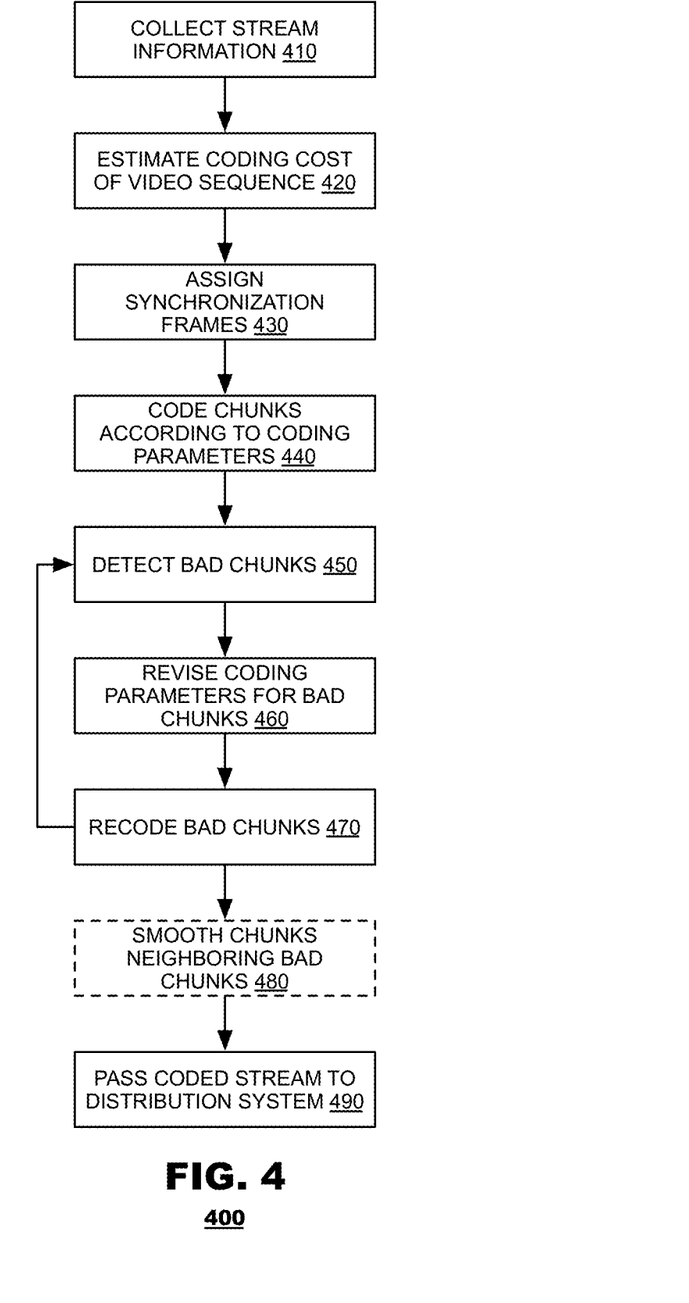
FIG. 4 illustrates a method according to another embodiment of the present invention.

FIG. 4 illustrates a method 400 according to another embodiment of the present invention. The method 400 may cause an input video sequence to be coded according to a distribution bit rate. The method 400 may begin by collecting information of the video sequence to be coded (box 410), for example, by estimating spatial complexity of frame content, motion of frame content, and the like. The method 400 may estimate coding cost to various portions of the video sequence from the statistics and assign preprocessing and coding parameters to those portions (box 420). The method 400 also may assign certain frames in the video sequence to be synchronization frames within the coded video sequence to coincide with chunk boundaries according to delivery parameters that govern at the distribution server (box 430). Thereafter, the method 400 may code the source video according to coding constraints estimated from the coding cost and according to chunk boundaries provided by the distribution server (box 440). Once the source video is coded, the method 400 may identify badly coded chunks (box 450), i.e., chunks that have coded quality that fail required quality requirements or chunks that have data rates that exceed predetermined limits. The method 400 may revise coding parameters of the bad chunks (box 460), recode the bad chunks (box 470) and detects bad chunks again (box 450). Once all chunks have been coded in a manner that satisfies the coding quality requirements and governing data rates, the method 400 may pass the coded stream to the distribution system (box 490).

In an embodiment, after the method 400 recodes bad chunks to yield coded chunks, the method 400 may recode data chunk(s) for video data to smooth coding quality of the video sequence (box 480).

The method 400 accommodates several variations. In one embodiment, a single stream could contain chunks with different resolutions and frame rates. One single chunk could contain frames with different resolutions and frame rates. For example, the resolution and frame rate may be controlled based on the bit rate of chunks. Alternatively, the resolution and frame rate may be controlled based on the visual quality of the chunks coded at different resolutions. Or, in another example, the resolution and frame rate may be controlled by scene change of the video source.

In another embodiment, a mixed resolution stream could be produced in multi-pass encoding. For example, a video coder may detect video sections with low visual quality, suggested by quantization factor, PSNR value, statistical motion and texture information. The detected low-quality sections then may be re-encoded at an alternative resolution and frame rate, which produces better visual quality.

In a further embodiment, a mixed resolution stream may be produced with a post composition method. For example, at similar bit rates, the source video may be coded at multiple resolutions and frame rates. The produced streams may be partitioned into chunks and the chunks then may be selected to form a mixed-resolution stream.

In another embodiment, chunk selection of the foregoing embodiments may be controlled to maintain visual quality across the coded sequence measured by quantization factor, PSNR value, and statistical motion and texture information. Alternatively, chunk selection may be controlled to reduce changes of visual quality, resolution, and frame rate across the coded sequence.

When producing a mixed resolution stream, the positions of resolution and frame-rate switching may be controlled to align with scene changes.

Figure 5:
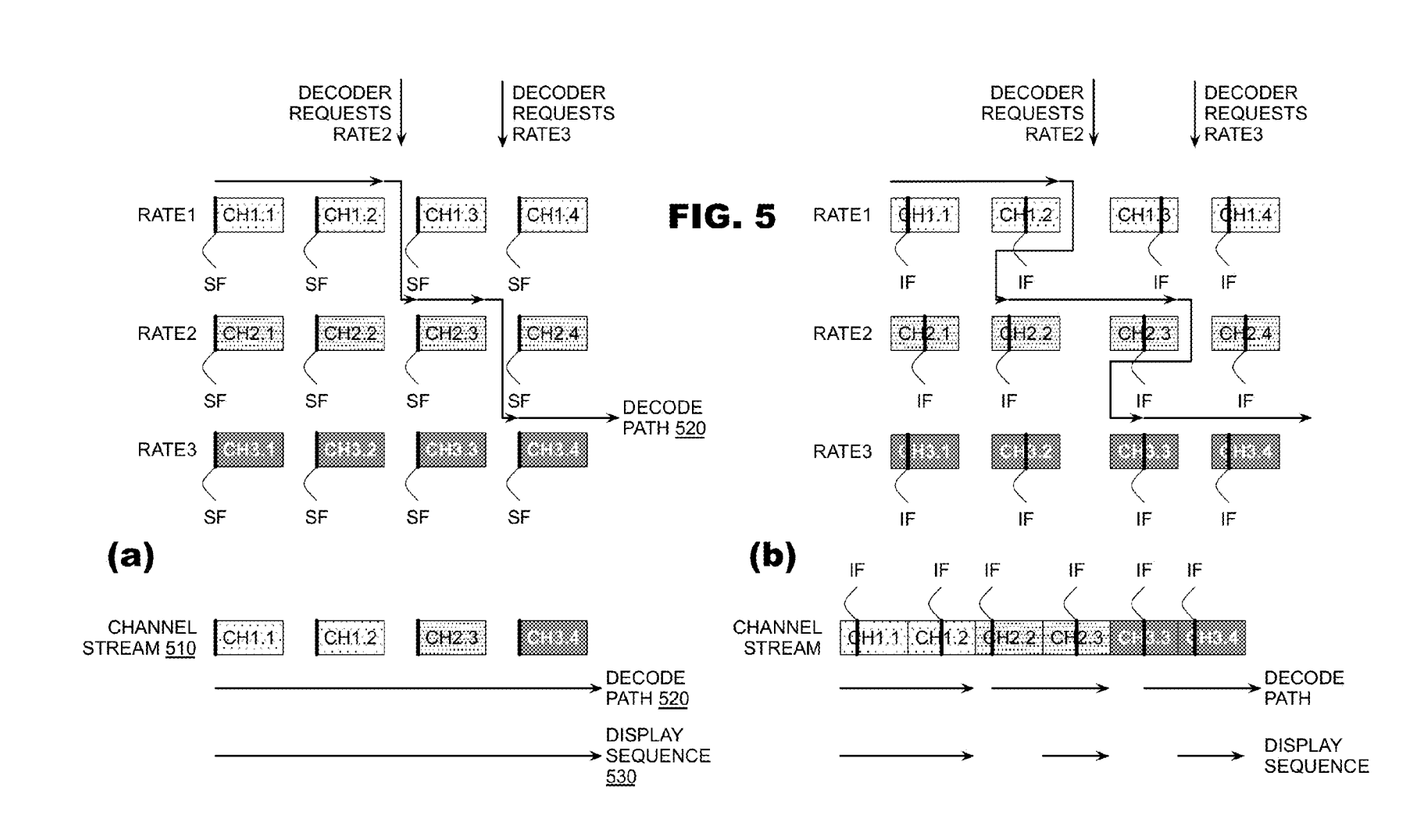
FIG. 5 illustrates application of synchronization frames to coded video streams according to an embodiment of the present invention.

FIG. 5(a) illustrates application of synchronization frames to coded video streams according to an embodiment of the present invention. FIG. 5(a) illustrates a video content item coded according to three different data rates, RATE1, RATE2 and RATE2, and parsed into chunks CH1.1-CH1.4, CH2.1-CH2.4 and CH3.1-3.4. According to the present invention, the first frame of each chunk may be coded as a synchronization frame SF that can be decoded without reference to any previously-coded frame of the video sequence. The synchronization frame may be coded as an intra-coded frame (colloquially, an "I frame"). For example, if the video sequence is coded according to the H.264 coding protocol, the synchronization frame may be coded as an Instantaneous Decoder Refresh frame ("IDR frame"). Other coding protocols may provide other definitions of I frames.

During delivery, as a video decoder changes the delivery rate of coded video data, a distribution server 250 (FIG. 2) will select chunks from among the various coded data streams to satisfy the video decoder's requests. In the example of FIG. 5(a), the distribution server 250 (FIG. 2) may generate a channel data stream 510 that includes chunks CH1.1, CH1.2 coded at RATE1, chunk CH2.3 coded at RATE2 and chunk CH3.4 coded at RATE3. Each chunk includes a synchronization frame SF as the first coded frame in the chunk and, therefore, the channel stream 510 establishes a decode path 520 as illustrated in FIG. 5(a). In the FIG. 5(a) embodiment, all frames from all chunks in the channel stream 510 will be included in a decode path 520 and in a display sequence 530 of frames displayed at the decoder. In this regard, this embodiment of the present invention provides for high efficiency coding because all coded frames that are included in the channel stream 510 are both decoded and displayed.

By contrast, a system that does not align synchronization frames to chunk boundaries, an example of which is shown in FIG. 5(b), would not have such efficiencies. FIG. 5(b) illustrates an exemplary coding scenario in which a video content item is coded according to three data rates and parsed into chunks, similar to FIG. 5(a). In FIG. 5(b), intra-coded frames IF are not aligned to chunk boundaries. Moreover, intra-coded frames IF in one chunk (say chunk CH1.2) are not aligned with intra-coded frames IF in counterpart chunks CH2.2, CH3.2 of other coded streams.

In the example of FIG. 5(b), as a video decoder changes the delivery rate of coded video data, a distribution server 250 (FIG. 2) must deliver not only the chunks that are requested but also additional chunks that are necessary for the video decoder to decode the requested chunks. In response to decoder requests for coded video data at different rates, a distribution server 250 must retrieve the requested chunk and also predecessor chunks of the newly requested stream that contain prediction references for frames in the requested chunk. Thus, if a distribution server 250 receives a request for RATE2 data after chunk CH1.2 is delivered, the distribution server 250 retrieves chunk CH2.3 and also a predecessor chunk CH2.2 that contains an intra-coded frame IF on which the frames in CH2.3 rely as a prediction reference. Similarly, if the distribution server 250 receives a request for RATE2 data after chunk CH2.3 is delivered, the distribution server 250 retrieves chunk CH3.4 and also a predecessor chunk CH3.3 that contains an intra-coded frame IF on which the frames in CH3.4 rely as a prediction reference. FIG. 5(b) illustrates a channel stream that would be assembled from the FIG. 5(b) coded streams. FIG. 5(b) also illustrates decode paths and display sequences that would be formed from this channel stream, each of which has lower utilization than the embodiment illustrated in FIG. 5(a).

Figure 6:
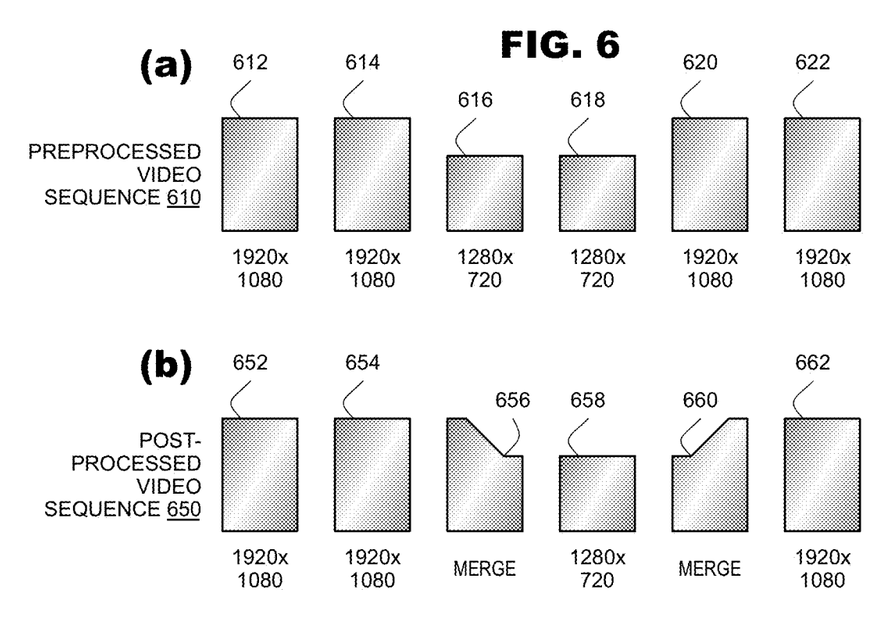
FIG. 6 illustrates an example of preprocessing operations that may be applied to a video sequence according to an embodiment of the present invention.

FIG. 6 illustrates an example of preprocessing operations that may be applied to a video sequence according to an embodiment of the present invention. In this embodiment, a preprocessor 220 (FIG. 2) may alter the resolution (or frame size) of source video on a chunk-by-chunk basis. In the example illustrated in FIG. 6(a), a preprocessor may generate a preprocessed video sequence 610 that includes chunks 612-622. Due to estimated coding complexity or other factors, a preprocessor may be controlled to set resolution of the video sequence to a first level for some chunks 612-614, 620-622 and to a different level for other chunks 616-618. Thus, the example of FIG. 6(a) illustrates frames of chunks 612-614, 620-622 set to 1920×1080 pixels whereas frames of 616-618 may be set to 1280×720 pixels. Other frame sizes and resolutions, of course, may be used as appropriate. The preprocessor may be controlled to vary resolution among more than two levels as appropriate, based on the constraints set by the distribution server 250 and estimated complexity of the source video being coded.

FIG. 6(b) illustrates exemplary post-processing operations that may be applied to the video sequence of FIG. 6(a) according to an embodiment of the present invention. In this example, a post-processed video sequence may include frames of chunks 652-654 (which correspond to chunks 612-614) output at the same resolution as they were coded. Chunk 656, however, which corresponds to chunk 616, may be subject to post-processing to exhibit a distributed transition between the resolution of chunk 654 and the new resolution at which chunk 656 was coded. The post-processor, for example, may spatially scale decoded frames of chunk 656 at different scaling sizes to achieve output frames at intermediate frame sizes. FIG. 6(b) also illustrates frames of chunk 658 being output at the same resolution as its counterpart chunk 618 was coded. Chunk 660, however, also may be subject to post-processing operation to exhibit another distributed transition corresponding to resolution change of the coded source chunks 618-620. Again, the post-processor may spatially scale decoded frames of chunk 660 at different scaling sizes to achieve output frames at intermediate frame sizes. Finally, in this example, FIG. 6(b) illustrates frames of chunk 662 being output at the same resolution as its counterpart chunk 622 was coded.

Figure 7:
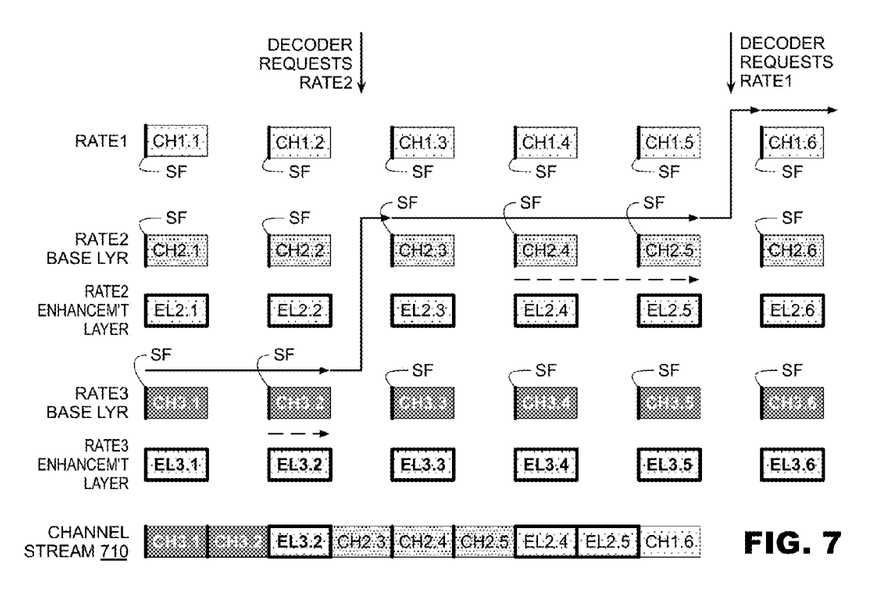
FIG. 7 illustrates an example of scalable video coding and delivery according to an embodiment of the present invention.

FIG. 7 illustrates an example of scalable video coding and delivery according to an embodiment of the present invention. In this embodiment, a video content item may be partitioned into chunks and coded at a plurality of data rates, shown as RATE1, RATE2 and RATE3, respectively. In this example, the RATE1 coded video data has the highest data rate, the RATE2 coded video data has an intermediate data rate and the RATE3 coded video data has the lowest data rate. As discussed with respect to FIG. 5, the chunks CH1.1-CH1.6, CH2.1-CH2.6, CH3.1-CH3.6 of each coded sequence each may include a synchronization frame SF as the first coded frame in the respective chunk.

The embodiment of FIG. 7 finds application with coding systems that employ scalable video coding. For any given data rate, a coding server may code a first representation of the video sequence as a base layer and code a second representation of the video sequence as an enhancement layer. The base layer coded video data may be decoded by a video decoding system and rendered as a base layer of video quality. The enhancement layer coded video data relies on a base layer coded video data to be decoded; when a base layer coded video data and an enhancement layer coded data are decoded jointly, the video data recovered therefrom has a visual quality that exceeds the video data that would be obtained by decoding the base layer data alone.

In an embodiment, a coding server may generate enhancement layer chunks for select data rates supported by the distribution server 250 (FIG. 2). Coded content of the enhancement layer chunks may be aligned with coded content of a corresponding base layer chunk. Thus, FIG. 7 illustrates RATE2 enhancement layer chunks EL2.1-EL2.6 corresponding to RATE2 base layer chunks CH2.1-CH2.6 and also illustrates RATE3 enhancement layer chunks EL3.1-EL3.6 corresponding to RATE3 base layer chunks CH3.1-CH3.6.

During operation, as a video decoder changes its requests for service, a distribution server 250 may retrieve the enhancement layer chunks for delivery to the video decoder. FIG. 7 illustrates an exemplary channel stream 710 illustrating use of the enhancement layer chunks. In this example, a video decoder initially receives service at RATE3 but requests service at RATE2. The distribution server 250 may have retrieved coded video data corresponding to base layer chunk 3.2 by the time the video decoder's request is received. In response, the distribution server 250 may begin retrieval of base layer chunks at the RATE2 level, chunks CH2.3-CH2.5. The distribution server 250 also may retrieve RATE3 enhancement layer chunks (shown as EL3.2) for delivery to the video decoder. The video distribution server 250 may determine how many enhancement layer chunks to retrieve based on the state of transmission queues (not shown) at the server and based on recent transmissions to the video decoder. For example, at the time a new service request is received from the video decoder, the distribution server 250 may have already retrieved base layer chunks from storage and have buffered them for transmission but have not transmitted the base layer chunks. The distribution server 250 may identify the buffered base layer chunks and retrieve counterpart enhancement layer chunks based on this identification. In another embodiment, the distribution server 250 may identify the base layer chunks that were transmitted within a predetermined period of time prior to receipt of the video decoder's new request for service; the distribution server 250 may send the enhancement layer chunks based on this identification.

FIG. 7 illustrates a video decoder request for service at RATE1. Again, in response to this request, the distribution server 250 may begin retrieval of base layer chunks at the new rate level beginning with chunk CH1.6. The distribution server 250 also may retrieve RATE2 enhancement layer chunks (shown as EL2.4, EL2.5) for delivery to the video decoder.

The techniques of the foregoing embodiments may accommodate several variations. For example, in one embodiment, enhancement layers may be used to bridge a low bit-rate stream and a high bit-rate stream. During a switch from a low bit-rate stream to a high bit-rate stream, a distribution server may estimate a period of the prior bit-rate stream that is buffered by a client device and may transmit enhancement layer chunk(s) corresponding to the buffered data.

In another embodiment, a coding server may create more than two streams of coded enhancement layer data around a specific bit rate. Some streams could be coded as scalable streams, e.g., using H.264/SVC techniques. These scalable streams could be used for stream switching. One stream could be split into a protected base layer and unprotected enhancement layers. The base layer could be transmitted using transmission control protocol ("TCP") while the enhancement layers could be transmitted using a user datagram protocol ("UDP") with varying degrees of protection.

Further, severs and client-side players may engage in techniques to smooth out differences among streams. For example, a coding server may adapt synchronization frames according to detections of scene changes within the source video. Further, a client-side player may switch at synchronization frames for stream switching to reduce abrupt change of visual quality. Alternatively, during switches among different resolutions, the resolution could be smoothly changed from the source resolution to the target resolution. The resolution transition could be realized by using post-processing and the said scalable video coding techniques.

The bit stream scalability and enhancement layers of the foregoing embodiments may be realized by using H.264/SVC techniques.

In another embodiment, rather than use scalable coding, there might be multiple encoding instances for any chunk, e.g., one instance for switching up bit rate, one instance for switching down bit rate, one instance for un-switched playback.

Figure 8:
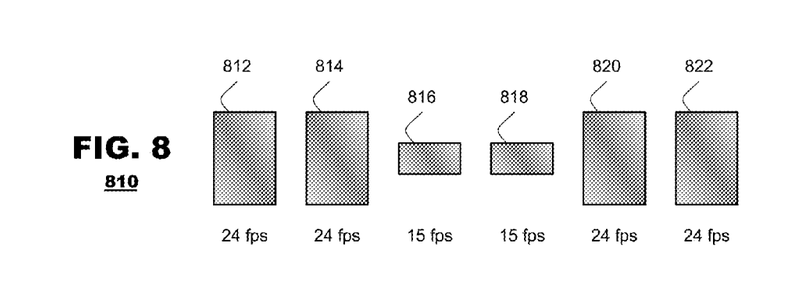
FIG. 8 illustrates an example of preprocessing operations that may be applied to a video sequence according to another embodiment of the present invention.

FIG. 8 illustrates an example of preprocessing operations that may be applied to a video sequence according to another embodiment of the present invention. In this embodiment, a preprocessor 220 (FIG. 2) may alter the frame rate of source video on a chunk-by-chunk basis. In the example illustrated in FIG. 8, a preprocessor 220 may generate a preprocessed video sequence 810 that includes chunks 812-822. Due to estimated coding complexity or other factors, a preprocessor 220 may be controlled to set frame rate of the video sequence to a first level for some chunks 812-814, 820-822 and to a different level for other chunks 816-818. Thus, the example of FIG. 8 illustrates frames of chunks 812-814, 820-822 set to 24 frames per second (fps) whereas frames of 816-818 may be set to 15 fps. Other frame rates, of course may be used as appropriate. The preprocessor 220 may be controlled to vary resolution among more than two levels of frame rates as appropriate, based on the constraints set by the distribution server 250 and estimated complexity of the source video being coded.

Figure 9:
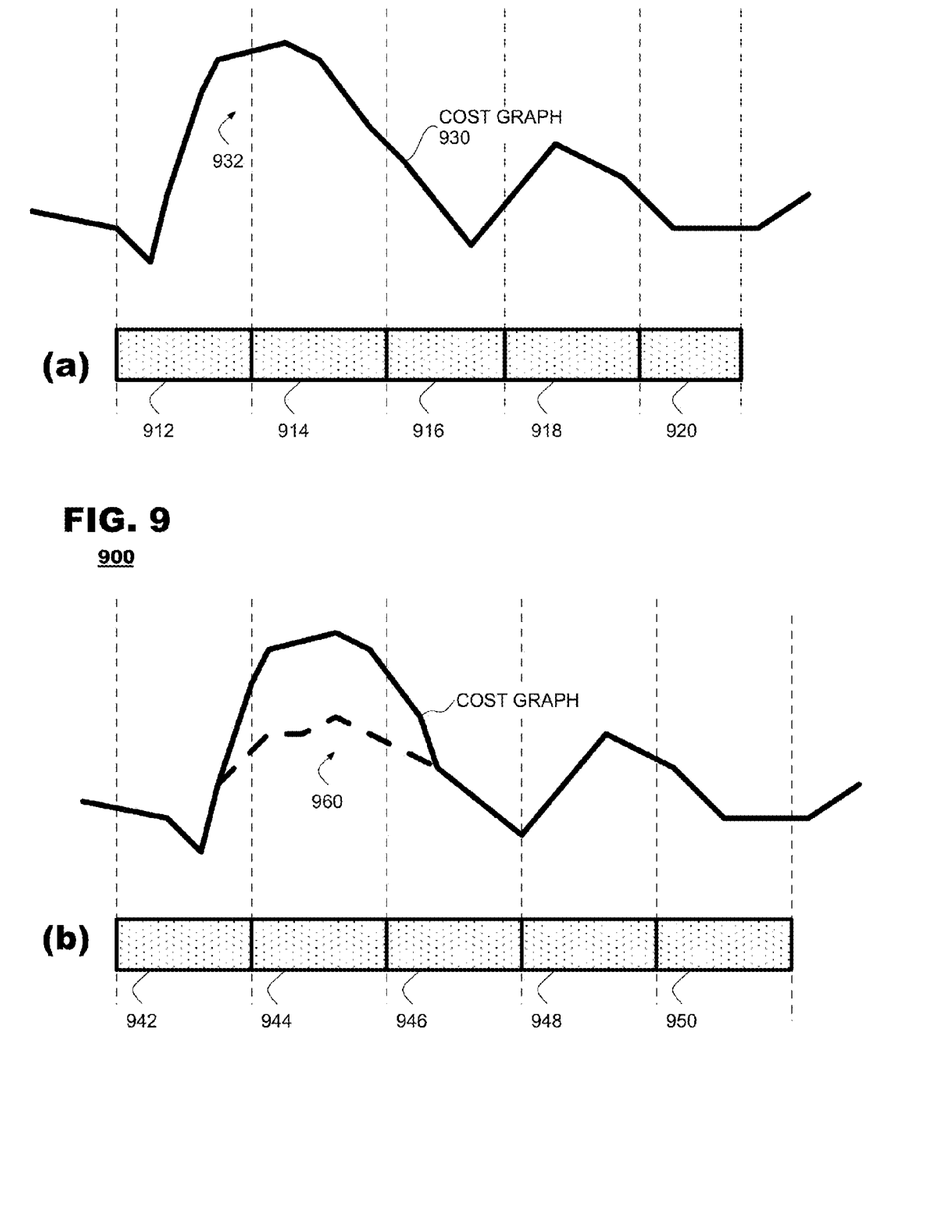
FIG. 9 illustrates an example of parsing coded video data into chunks according to an embodiment of the present invention.

FIG. 9 illustrates an example of parsing coded video data into chunks according to an embodiment of the present invention. In FIG. 9(a), a coding server 210 (FIG. 2) may estimate a cost of coding an input video sequence 900, for example, based on complexity of image content or other factors. The coding server 210 may partition the video sequence into chunks 912-920 prior to coding and may align chunk boundaries to distribute the cost of coding across the chunks 912-920.

FIG. 9(a) illustrates an exemplary cost graph 930 representing bit rates associated with frames of the video sequence 900. As illustrated, the chunks 912-920 may be assigned to the video sequence to align chunk boundaries to portions of the video sequence 900 having high coding cost. For example, the cost graph 930 has a relative maximum in area 932. In an embodiment, a boundary between chunks 912 and 914 may be aligned to the maximum 932 to increase the likelihood that the cost of coding an associated portion of the video sequence 900 will be distributed over the pair of chunks 912, 914 rather than a single chunk. Note that chunks need not have identical durations and, therefore, chunks for high bit-rate portions of a video sequence 900 may have shorter durations and chunks of other, lower bit-rate portions of the video sequence 900 may have longer durations.

FIG. 9(b) illustrates a chunk sequence that might be created from the cost curve of FIG. 9(a) without use of flexible chunk assignments. In a system where chunks have a fixed duration, it may not be possible to apportion high data rate portions of a video sequence 900 to multiple chunks. In such implementations, a coder may be forced to apply lower quality coding processes to portions of a video sequence (represented by curve 960) when it is compelled to code a high cost portion of a video sequence in a single chunk 944.

Figure 10:
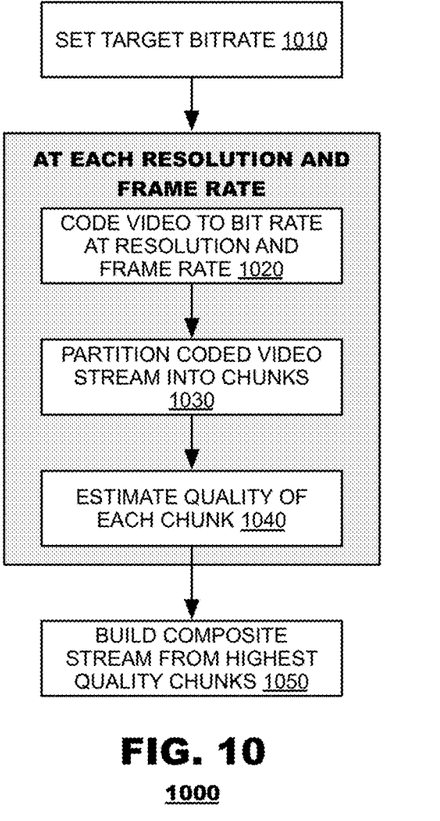
FIG. 10 illustrates another method according to an embodiment of the present invention.

FIG. 10 illustrates another method 1000 according to an embodiment of the present invention. The method 1000 may be performed to build coded video data for a single delivery rate supported by a distribution server 250 (FIG. 2). The method 1000 may begin by setting a target bit rate for coded video (box 1010). Thereafter, the method 1000 may operate iteratively to attempt to code source video data at each of a plurality of resolutions and frame rates. Specifically, for each combination of resolution and frame rate, the method 1000 may code the source video at the respective resolution and frame rate (box 1020). The method 1000 may partition the coded video obtained thereby into chunks (box 1030) and may estimate the coding quality of each chunk (box 1040). Operation of box 1030 may be performed identically on each iteration so that the chunks obtained on each resolution and frame rate correspond to common sequences of source video.

After all candidate resolutions and frame rates have been applied to the coded video, the method 1000 may build a composite coded video stream for the video sequence by selecting, for each chunk in the sequence, the highest quality chunk obtained thereby (box 1050).

The foregoing discussion has described operation of the embodiments of the present invention in the context of coding servers, distribution servers and client devices. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general purpose processors as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
    coding a common video sequence into a plurality of coded data streams, each coded data stream including a base layer of coded data representing the video sequence coded using coding parameters tailored for a respective transmission bit rate of the respective stream, at least one coded stream including at least one enhancement layer of coded data representing scalable coding of the video sequence with reference to a transmission bit rate associated with the base layer of a next higher stream; and
    building a manifest file representing an index of transmission units of the respective coded data streams;
    wherein:
        sets of transmission units from among the coded base layers and enhancement layers respectively contain multiple frames and are aligned to each other, and
        a first coded frame of each transmission unit of the base layer streams is coded as to be a synchronization frame, the synchronization frame defining a path such that all coded frames of the respective transmission unit are decoded according to the path; and
        the coded data streams and manifest file are stored for delivery to a client device.

2. The method of claim 1, wherein the synchronization frame of each transmission unit is decodable without reference to any previously-coded frame of the video sequence.

3. The method of claim 1, wherein at least two coded data streams are coded at different frame rates.

4. The method of claim 1, wherein at least two coded data streams are coded at different frame resolutions.

5. The method of claim 1, wherein chunks of a common coded data stream include video data coded at different frame resolutions.

6. The method of claim 1, wherein the synchronization frame is an I-frame.

7. The method of claim 1, wherein the synchronization frame is an Instantaneous Decoder Refresh Frame.

8. A video streaming method, comprising:
transmitting to a client device transmission units retrieved from a first stored sequence of base layer coded video data of a requested video that has been coded using a first selection of coding parameters tailored for a transmission bit rate of the first stored sequence of base layer coded video data,
in response to a request from the client device,
transmitting to the client device transmission units of enhancement layer coded video data representing scalable coding with reference to a transmission bit rate associated with a second stored sequence of base layer coded video data, and
transmitting to the client device transmission units retrieved from the second stored sequence of base layer coded video data of the requested video that has been coded using a second selection of coding parameters tailored for the transmission bit rate associated with the second stored sequence of base layer coded video data,
wherein the stored transmission units of the first and second sequences include multiple frames and are aligned to each other, and include transmission units that represent common portions of the requested video and include a synchronization frame as a first coded frame therein, the common portions being determined based on a cost of coding the requested video.

9. The method of claim 8, wherein the synchronization frame is an I-frame.

10. The method of claim 8, wherein the synchronization frame is an Instantaneous Decoder Refresh Frame.

11. The method of claim 8, further comprising, prior to transmission of any transmission units, transmitting to the client device a manifest file representing an index of transmission units of the first and second sequences.

12. A video coding method, comprising:
coding a common video sequence into two or more base layer coded data streams, each base layer coded data stream representing the video sequence coded using coding parameters tailored for a respective transmission bit rate, one transmission bit rate higher than another transmission bit rate;
coding the video sequence as at least one enhancement layer coded data stream using the lower bit rate base layer coded data stream as a reference, and the high transmission bit rate as a target bit rate, the at least one enhancement layer coded data stream representing scalable coding of the common video sequence with reference to the high transmission bit rate; and
partitioning, based on a cost of coding the video sequence, the coded data streams into a plurality of transmission units for delivery,
wherein the transmission units of each coded data stream has a counterpart in the other coded data stream,
each transmission unit has multiple frames and the transmission units are aligned to each other, and
the coding steps and the partitioning step cooperatively define continuous decode paths for the coded video sequence when the transmission units are decoded in coding order such that all coded frames in the base layer coded data streams are displayed and decoding of transmission units of the enhancement layer coded data stream provides transition between the base layer coded data streams.

13. The method of claim 12, wherein a synchronization frame of each transmission unit is decodable without reference to any previously-coded frame of the video sequence.

14. The method of claim 12, wherein, for at least one coded data stream, the coding comprises coding the video sequence as a base layer of coded data and an enhancement layer of coded data, wherein a first coded frame of each transmission unit of the base layer coded data streams includes a synchronization frame.

15. The method of claim 12, wherein at least two coded data streams are coded at different frame rates.

16. The method of claim 12, wherein at least two coded data streams are coded at different frame resolutions.

17. The method of claim 12, wherein chunks of a common coded data stream include video data coded at different frame resolutions.

18. The method of claim 13, wherein the synchronization frame is an I-frame.

19. The method of claim 13, wherein the synchronization frame is an Instantaneous Decoder Refresh Frame.

20. The method of claim 12, further comprising, for one of the coded data streams, coding the video sequence as an enhancement layer for the one coded data stream.

21. A video decoding method, comprising:
retrieving first transmission units representing base layer coded video data streams of a video sequence coded for a first delivery rate;
decoding coded data present in the transmission units of the first delivery rate;
requesting second transmission units representing base layer coded video data streams of the video sequence coded for a second delivery rate;
in response to the request:
receiving transmission units of enhancement layer coded video data representing scalable coding with reference to the second delivery rate; and
thereafter, receiving and decoding the second transmission units;
wherein a first coded frame of each transmission unit of the first and second transmission units is a synchronization frame, and
wherein the transmission units of the first and second transmission units include multiple frames and are aligned to each other, and include transmission units that represent common portions of the video sequence, the common portions being determined based on a cost of coding the video sequence.

22. The method of claim 21, wherein the synchronization frame of each transmission unit is decodable without reference to any previously-coded frame of the video sequence.

23. The method of claim 21, wherein, for at least one coded data stream, the coding comprise coding the video sequence as a base layer of coded data and an enhancement layer of coded data, wherein the base layer includes the synchronization frame.

24. The method of claim 21, wherein at least two coded data streams are coded at different frame rates.

25. The method of claim 21, wherein at least two coded data streams are coded at different frame resolutions.

26. The method of claim 21, wherein chunks of a common coded data stream include video data coded at different frame resolutions.

27. The method of claim 21, wherein the synchronization frame is an I-frame.

28. The method of claim 21, wherein the synchronization frame is an Instantaneous Decoder Refresh Frame.

29. The method of claim 21, wherein each coded data stream comprises data indicating its visual quality, which is used to decode the stream.

30. The method of claim 12, further comprising determining a resolution and frame-rate of each transmission unit to maintain a maximum visual quality measured over a decode path.

\* \* \* \* \*